(12) United States Patent
Rock

(10) Patent No.: US 6,928,822 B2
(45) Date of Patent: Aug. 16, 2005

(54) TURBINE ENGINE APPARATUS AND METHOD

(75) Inventor: Kelly P. Rock, Orlando, FL (US)

(73) Assignee: LyteSyde, LLC, Henderson, NV (US)

( * ) Notice: Subject to any disclaimer, the term of this patent is extended or adjusted under 35 U.S.C. 154(b) by 0 days.

(21) Appl. No.: 10/156,176

(22) Filed: May 28, 2002

(65) Prior Publication Data
US 2003/0221431 A1 Dec. 4, 2003

(51) Int. Cl.$^7$ .............................. F02C 7/22; F02C 7/26
(52) U.S. Cl. ........................................ 60/776; 60/737
(58) Field of Search .................. 60/776, 737, 738, 60/748

(56) References Cited

U.S. PATENT DOCUMENTS

| | | | | |
|---|---|---|---|---|
| 3,937,007 A | * | 2/1976 | Kappler ....................... 60/777 |
| 4,041,699 A | * | 8/1977 | Schelp ...................... 60/39.55 |
| 4,226,088 A | * | 10/1980 | Tsukahara et al. ............ 60/752 |
| 4,292,801 A | * | 10/1981 | Wilkes et al. ................. 60/776 |
| 4,463,568 A | * | 8/1984 | Willis et al. .................. 60/742 |
| 4,893,475 A | * | 1/1990 | Willis ........................... 60/732 |
| 5,117,636 A | * | 6/1992 | Bechtel et al. ................ 60/738 |
| 5,375,995 A | * | 12/1994 | Dobbeling et al. ............ 431/8 |
| 5,592,819 A | * | 1/1997 | Ansart et al. .................. 60/737 |
| 6,113,078 A | * | 9/2000 | Rock ........................... 261/21 |
| 6,151,899 A | * | 11/2000 | Park ............................ 60/748 |
| 6,234,459 B1 | * | 5/2001 | Rock ......................... 261/79.2 |
| 6,427,446 B1 | * | 8/2002 | Kraft et al. ................... 60/737 |
| 6,484,509 B2 | * | 11/2002 | Kraft et al. ................... 60/776 |
| 6,513,334 B2 | * | 2/2003 | Varney ........................ 60/776 |
| 6,625,988 B2 | * | 9/2003 | Weisenstein et al. ......... 60/777 |
| 6,669,176 B2 | * | 12/2003 | Rock ......................... 261/79.2 |
| 6,679,061 B2 | * | 1/2004 | Steinbach et al. ............ 60/777 |

* cited by examiner

Primary Examiner—Cheryl Tyler
Assistant Examiner—William H. Rodriguez
(74) Attorney, Agent, or Firm—Holland & Hart

(57) ABSTRACT

A fuel processing system for a turbine engine includes a fuel processor which mixes fuel and air through a vortical flow which involves the introduction of air tangentially into the fuel processing chamber through inlet apertures formed in the outer wall of the fuel processing chamber. The vortical flow of fluid inside the fuel processing chamber breaks down or atomizes fuel such that the resulting fuel/air mixture will be ideal for combustion. The fuel/air mixture is thereafter introduced into a combustion chamber of the combustor of a turbine engine apparatus. One or more fuel processing units operatively coupled in series may be utilized.

13 Claims, 6 Drawing Sheets

TURBINE ENGINE APPARATUS AND METHOD

FIELD OF THE INVENTION

This invention relates to turbine engines, and more particularly to fuel processing devices for use in connection with turbine engines.

BACKGROUND OF THE INVENTION

Turbine engines have existed for years. While turbine engines have traditionally been associated most closely with jet airplanes, turbine engines have also been used in connection with various other types of other areas with success. For example, turbine engines may be used for helicopters, turbo prop planes, land vehicles, ultralight planes, unlimited hydroplanes, military tanks, and hovercraft, as well as stationary and mobile power plants, just to name a few.

One of the key aspects to any turbine engine relates to the proper and efficient burning of fuel within the fuel combustion chamber of the turbine engine. As those skilled in the art understand, combustion of fuel in the combustion chamber creates heat which, in turn, drives a turbine fan and actuates the turbine engine. Increased fuel efficiency is always desirable in turbine engines.

Accordingly, there has been and continues to be a need to develop a more efficient way to process and burn fuel within a fuel combustion chamber of a gas turbine engine. The present invention solves the longstanding problems associated with improper or incomplete fuel processing and fuel combustion within a fuel combustion chamber of a turbine engine.

SUMMARY OF THE INVENTION

The present invention relates to a fuel processing apparatus for a turbine engine. The fuel processor of the present invention, takes incoming fuel, introduces fuel directly into a fuel mixing chamber, and introduces air tangentially into the fuel processing chamber through inlet apertures formed in an outer wall of the fuel processing chamber. The fuel processor configuration creates a vortical flow of fluid within the fuel processing chamber. The vortical flow of fluid inside the fuel processing chamber breaks down or atomizes the fuel such that the resulting fuel/air mixture will be ideal for combustion. The mixed fuel is introduced into a combustion chamber of the combustor of a turbine engine apparatus.

To create the vortical flow of fuel/air within the fuel mixing chamber, a plurality of apertures extend tangentially through an outer wall of the mixing chamber. The apertures cause air to be introduced tangentially into the fuel processing chamber which creates a vortical flow (i.e., a tornado-like flow) within the fuel processing chamber. The vortical flow causes the fuel/air mixture within the fuel processing chamber to impinge upon itself and further break down or atomize the fuel.

In one embodiment, a preliminary or initial fuel mixing chamber is coupled in series with a secondary or primary fuel processing chamber for optimal fuel processing. Alternatively, a single fuel processing chamber may be utilized. It will be understood by those skilled in the art that various fuel processing configurations may be utilized without departing from the scope of the present invention.

The foregoing and other features, utilities, and advantages of the invention will become apparent from the following more detailed description of the invention with reference to the accompanying drawings.

DETAILED DESCRIPTION OF THE INVENTION

The present invention relates to a fuel processor for preparing fuel prior to introducing fuel into a combustor utilized in connection with a gas turbine engine. As mentioned, a gas turbine engine, according to the present invention, could be used in connection with jet airplanes, helicopters, turbo prop planes, land vehicles, ultralight planes, unlimited hydroplanes, military tanks, hovercraft, and any other suitable application.

Figure 1:
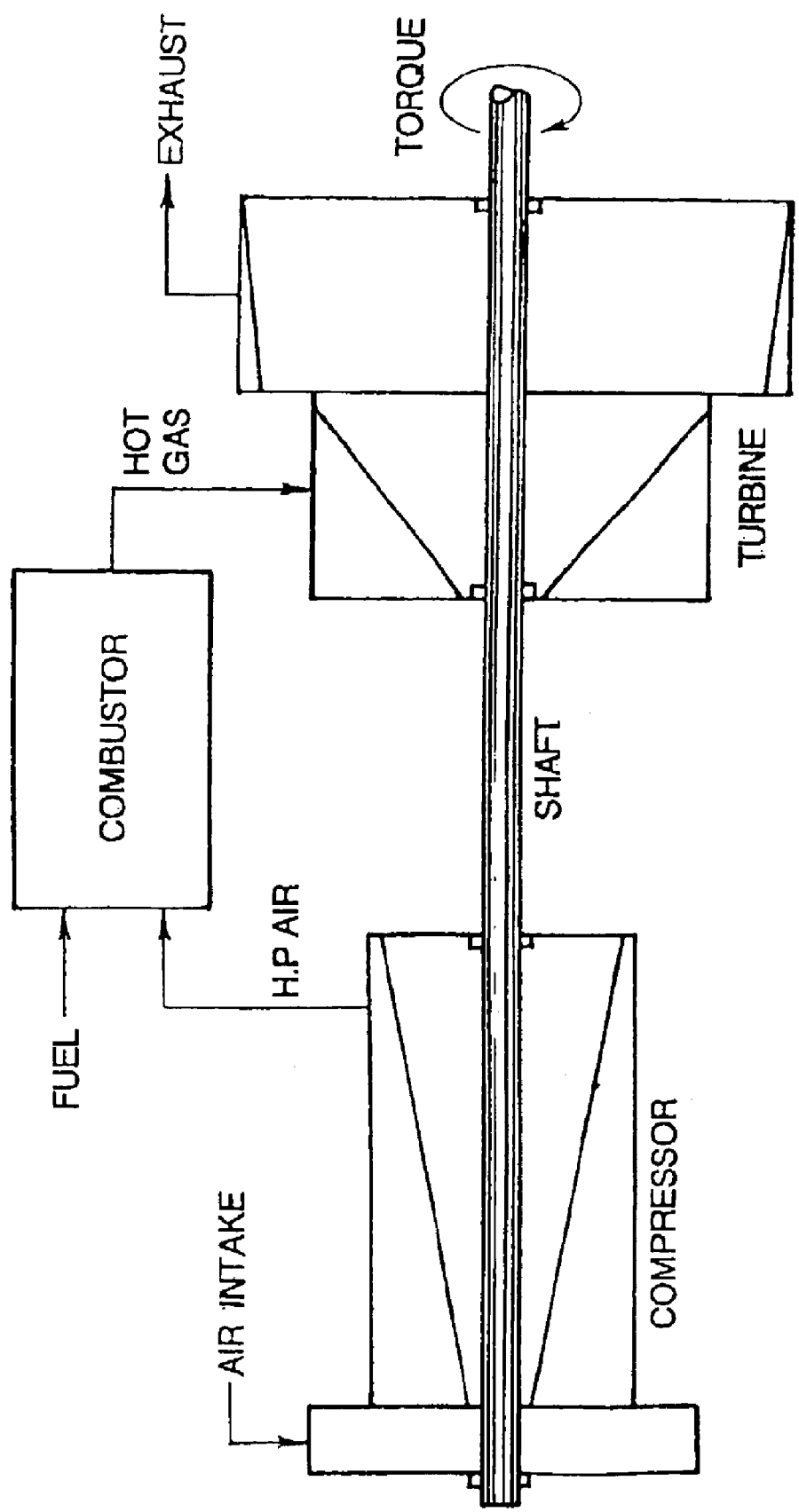
FIG. 1 is a diagrammatic view of a typical gas-turbine configuration exhibiting a Brayton or Joule cycle.

With reference to FIG. 1, a typical gas turbine engine configuration utilizing a basic Brayton or Joule cycle characteristics is shown. It is well understood by those skilled in the art as to the basic operation of such a gas turbine engine. As shown, air enters into the compressor wherein the pressure of the air is increased. Pressurized air and fuel are thereafter introduced into the combustor, which burns the fuel and raises the temperature of the compressed air under constant-pressure conditions. The resulting high-temperature gases are then introduced to the engine where they expand and perform work.

The present invention relates to an apparatus for preparing fuel prior to allowing the fuel to enter into the combustion chamber. The fuel processing chamber may be a separate unit entirely upstream of the combustor, or alternatively, may be incorporated into the combustor unit. Irrespective of its precise configuration or assembly, the fuel processor prepares the fuel for combustion in connection with the operation of gas turbine engines.

Figure 2:
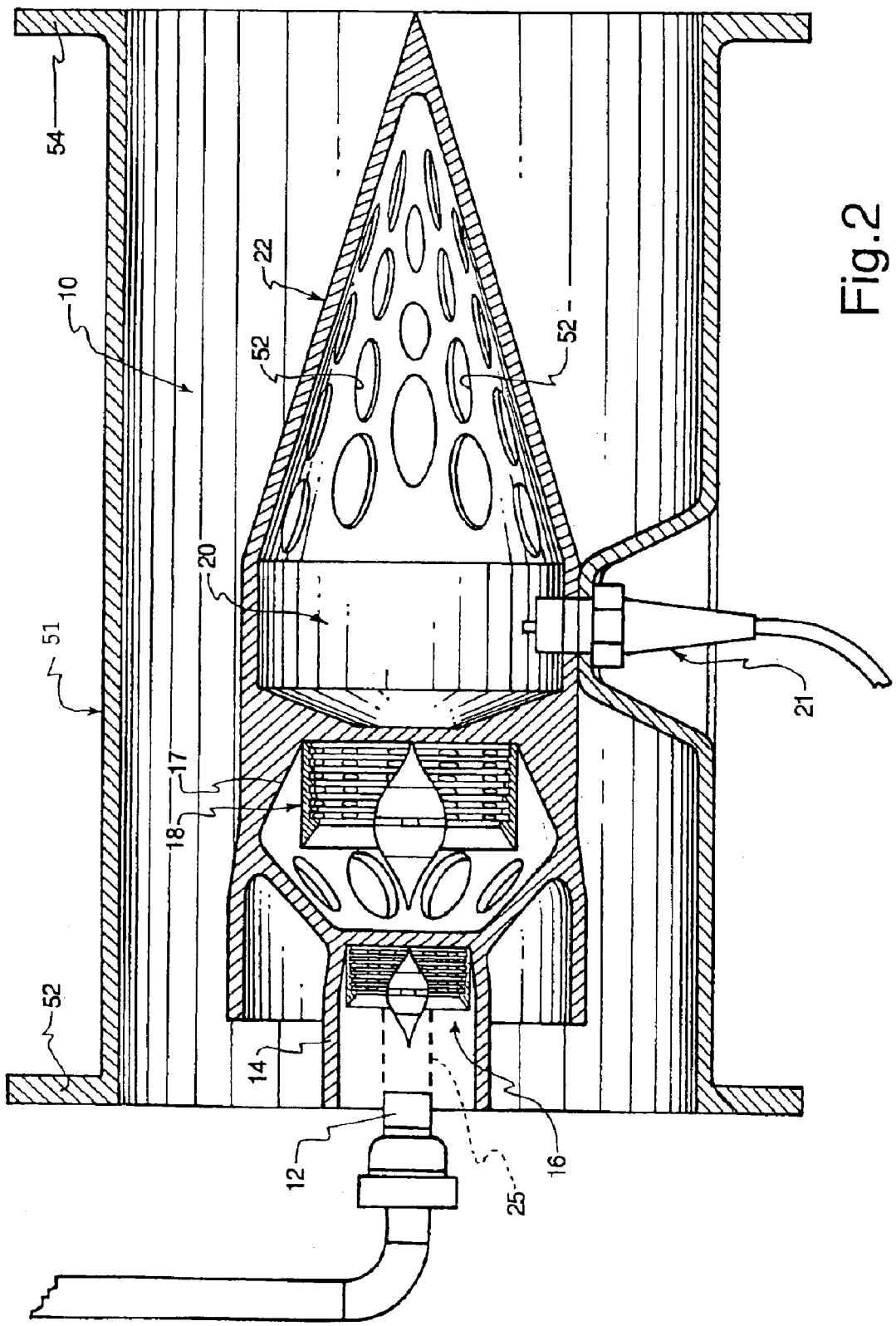
FIG. 2 is a sectional side elevation view of a fuel processing system according to the present invention.
Figure 3:
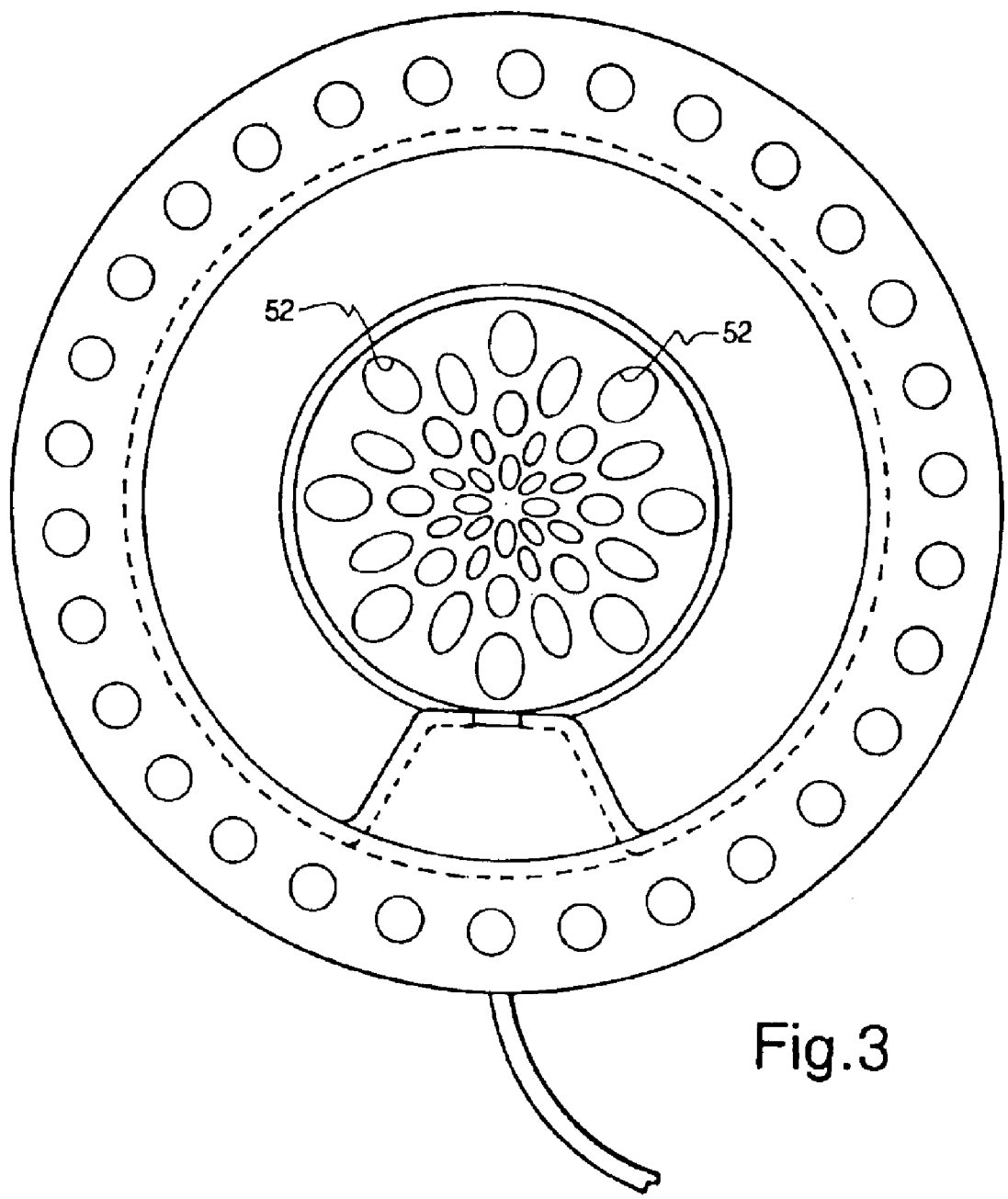
FIG. 3 is a right side elevation view of the fuel processing system of FIG. 2.

FIG. 2 shows a fuel processing apparatus and system 10 for use in combination with a turbine engine. The fuel processor 10 includes a fuel inlet or fuel supply 12, an initial fuel processor housing 14, an initial fuel processor 16, a secondary or main fuel processor housing 17, and a main or secondary fuel processor 18. Processed fuel then enters into the combustion chamber 20 where an igniter 21 ignites the atomized fuel from main processor 18 and fuel combustion results. The flame produced from fuel combustion is held within the flame holder 22. Hot gases are allowed to escape the fuel processing system to impinge upon the blades of the turbine fan and perform the traditional work associated with turbine engines.

Figure 4:
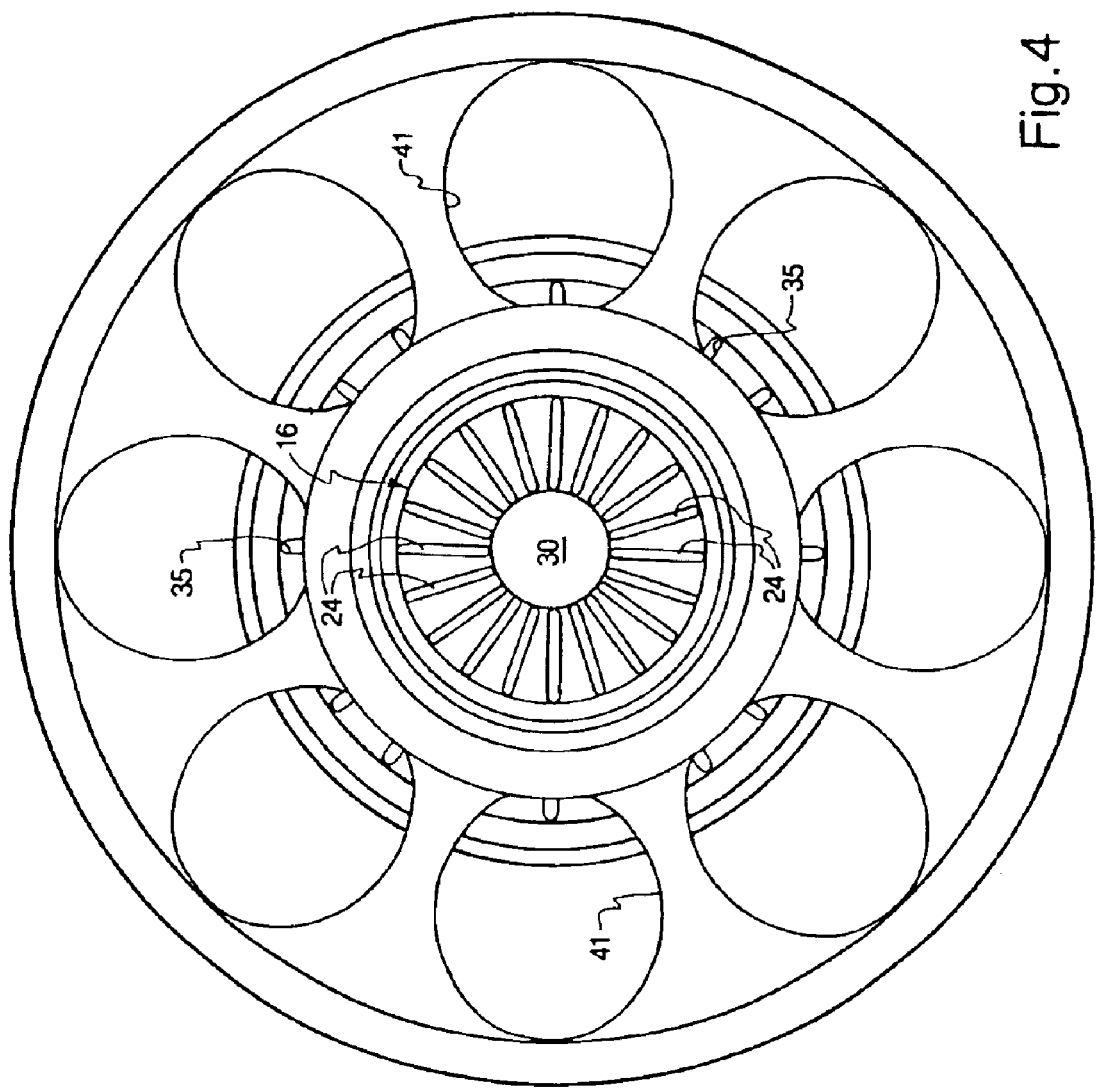
FIG. 4 is a left side elevation view of the fuel processing system of FIG. 2.
Figure 5:
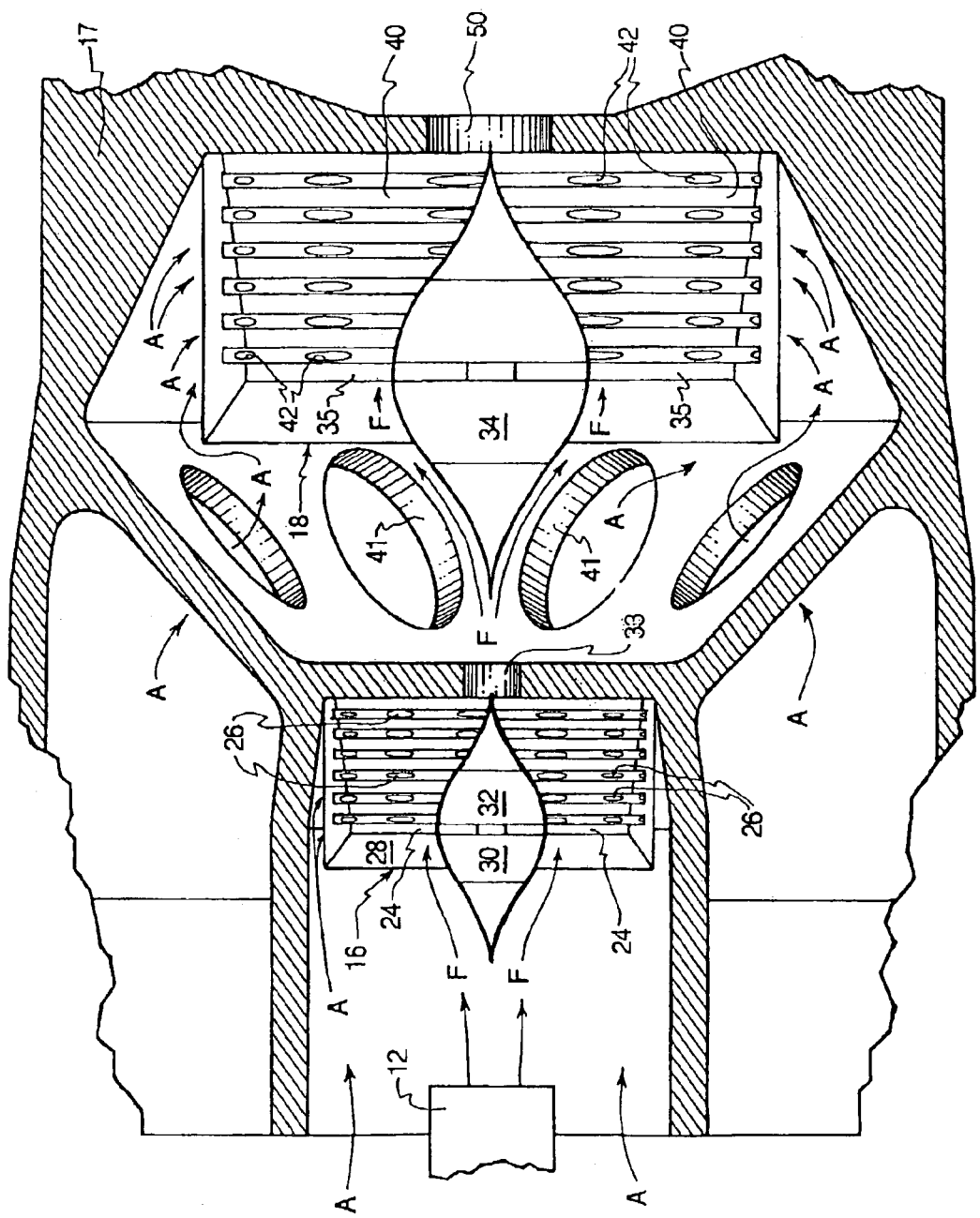
FIG. 5 is an enlarged sectional side elevation view of the fuel processing chamber of the fuel processing system for turbine engines shown in FIG. 2.

With reference more specifically to FIGS. 4 and 5, an initial fuel processing chamber 16 receives fuel from fuel inlet 12. The fuel (represented by fuel flow arrow F) flows into a plurality of inlet openings 24 (see FIG. 4) formed on the inlet end of the initial processing chamber. Alternatively, as shown in FIG. 2, the fuel inlet may be directly attached to the fuel processor 16 by extending inlet 12 to include a section or length 25 (shown in dashed lines) and thus the inlet apertures 24 would be eliminated.

Ambient air (represented by air flow arrow A) is allowed to enter into the main fuel processing chamber 16 by way of tangential apertures 26 formed in the wall 28 of the initial fuel processor 16. Air entering into the initial fuel processor by way of tangential apertures 26 creates a vertical flow (i.e., a swirling, tornado-like flow) within the fuel processing chamber. The vertical flow causes the fuel/air mixture to impinge upon itself as the fuel-air spins within the fuel processing chamber 16. This serves to break down and homogenize the fuel into an optimal fuel/air mixture for fast, efficient combustion.

To facilitate or enhance the flow of fuel into the fuel processing chamber 16, a pair of cone-shaped members 30, 32, are disposed in a back-to-back manner such that fuel F flowing from inlet 12 will pass around and be separated by initial cone 30, will flow into apertures 24 (FIG. 4) and ultimately into the fuel processing chamber 16. As the fuel/air mixture passes down toward the downstream end of fuel processor 16, it passes around adjacent cone 32 and toward a fuel outlet 33 (FIG. 5). It is to be understood that the cone-shaped members 30, 32 may be omitted from the fuel processor without departing from the scope of the present invention. In particular, where the fuel inlet 12 is attached directly to the fuel processor 16 (shown in dashed lines 25 in FIG. 2), cone 30 can be omitted as well as inlet apertures 24.

After the fuel and air have mixed in the initial processing chamber 16, fuel thereafter flows around a secondary cone-shaped member 34 and through inlet apertures 35 to the main or secondary fuel processor. Fuel thereafter enters into the main processing chamber 18. As it enters into main processing chamber 18, the air/fuel mixture is already experiencing a vortical flow and will rotate about cone-shaped member 34. Additional ambient air A is also allowed to flow into the secondary or main processing chamber 18 by passing initially through apertures 41 in the housing and subsequently through exterior tangential apertures 42 which extend through the housing wall 40. The initially processed fuel/air mixture is further processed in the primary fuel processing chamber 18. The fuel is processed in the secondary or main fuel processing chambers 1 8 substantially the same as it is with respect to the initial fuel processing chamber 16. Indeed, it is to be understood that one of the fuel processors may be utilized alone, without additional fuel processors. Alternatively, more than two fuel processors may be utilized in a series to achieve the desired fuel/air breakdown or homogenization. Ultimately, fuel passes through outlet 50 (FIG. 5) and into the combustion chamber 20 (FIG. 2) where an igniter 21, such as a spark plug, ignites the processed fuel and a flame results, which is held by the flame holder 22. Heat is allowed to escape via apertures 52 formed in the cone-shaped flame holder 22.

The fuel/air mixture passing through outlet 50 of the main fuel processing chamber 18 is moving in a vortical flow. Thus, when the fuel/air mixture passes into the combustion chamber 20 (FIG. 2), the fuel/air mixture continues to flow in a vortical manner. This vortical flow enhances combustion for a more efficient use of the fuel to be utilized by the turbine engine. The vortical flow within the combustion chamber 20 ensures that the fuel/air mixture continues to be broken down or atomized to the appropriate degree, and that the fuel/air mixture is circulated within the combustion chamber 20 for complete combustion.

With reference to FIG. 2, the fuel processing apparatus and system 10 may be, in one embodiment, secured to a specialized housing 51 it which envelopes the entire fuel processing system 10. A first flange 52 may be provide to allow the fuel processing system to be secured to any desired upstream mechanism, such as a compressor. A second flange 54 may be provided to secure the fuel processing system 10 to any appropriate downstream mechanism, such as a turbine.

Figure 6:
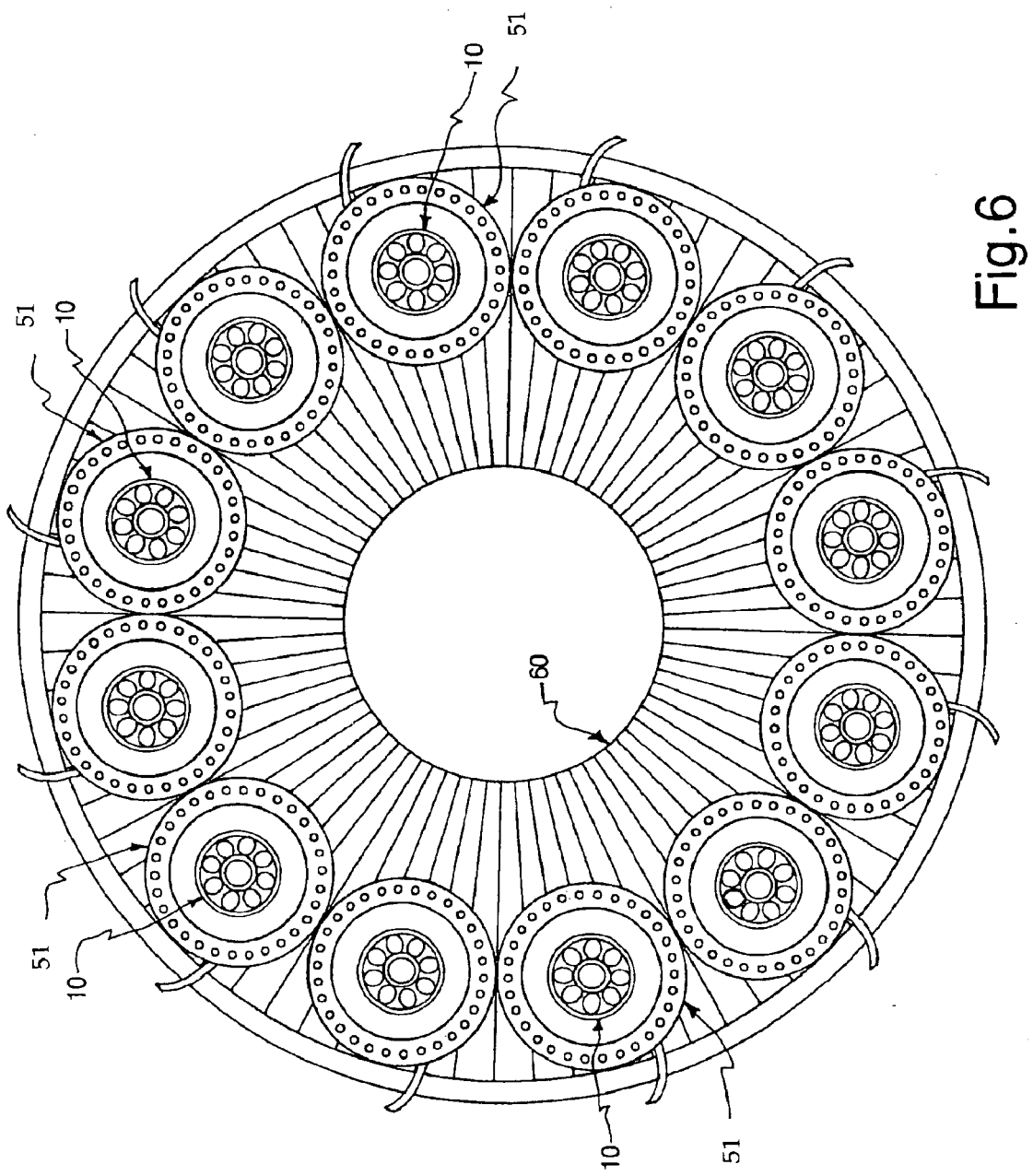
FIG. 6 is a front view of a turbine engine apparatus with a plurality of fuel processing chambers, which form combustors, for a turbine engine.

With reference to FIG. 6, a turbine 60 is shown which is coupled in turn, to a plurality of fuel processing system housings 51 which hold, in turn, individual fuel processing systems 10. The operation of the turbine 60 is conventional and will be known by those skilled in the art. By utilization of the plurality of novel fuel processors 10, more efficient utilization of fuel results, and performances of the turbine 60 improves.

While this invention has been described with reference to certain specific embodiments and examples, it will be recognized by those skilled in the art that many variations are possible without departing from the scope and spirit of this invention. The invention, as described by the claims, is intended to cover all changes and modifications of the invention which do not depart from the spirit of the invention. The words "including" and "having," as used in the specification, including the claims, shall have the same meaning as the word "comprising."

What is claimed is:

1. A fuel processing chamber for a turbine engine, comprising:
    a chamber housing defining a first pre-combustion vortex chamber and a second pre-combustion vortex chamber for creating a vortical flow of fluid;
    a first air introduction passageway in fluid communication with the first pre-combustion vortex chamber, and a second air introduction passageway in fluid communication with the second pre-combustion vortex chamber;
    a chamber output coupled to the second pre-combustion vortex chamber for discharging fluid from the second pre-combustion vortex chamber;
    one of the first or the second pre-combustion vortex chambers comprising an array of input apertures formed in the chamber housing to allow the input of fluid tangentially into the first or the second pre-combustion vortex chamber to create the vortical flow that passes through the housing, the vortical flow breaking down into smaller particles and vaporizing any non-vaporized particles in the vortical flow.

2. A fuel processing chamber according to claim 1, wherein the input apertures are configured to allow a differential pressure of fluid to be provided at the input apertures according to the location of the apertures.

3. A fuel processing chamber for a turbine engine, comprising:
    a first chamber housing defining a first pre-combustion vortex chamber and a second chamber housing defining a second pre-combustion vortex chamber, the second pre-combustion vortex chamber coupled to the first pre-combustion vortex chamber in series;
    a plurality of input apertures formed in each chamber housing, the plurality of input apertures including head-on inlet apertures and tangential apertures formed in each chamber housing, to allow air and a second fluid to be input both directly and tangentially into each vortex chamber;
    a first pre-combustion vortex chamber output operatively coupled to the input apertures formed in the second pre-combustion vortex chamber.

4. A fuel processing chamber according to claim 3, where the input apertures formed in the first chamber housing are configured to allow a differential pressure of fluid at the input apertures according to a location of the apertures.

5. A fuel processing chamber for turbine engines, comprising:

a fluid flow path having a high pressure end and a low pressure end;

a vortex housing defining first and second pre-combustion vortex chambers through which a fluid flow is directed, the pre-combustion vortex chambers being positioned along the fluid flow path and interposed between the high pressure end and the low pressure end to permit a fluid to flow from the high pressure end to the low pressure end;

a first air supply path in fluid communication with the first pre-combustion vortex chamber and a second air supply path in fluid communication with the second pre-combustion vortex chamber;

a flow restrictor disposed between the first and second pre-combustion vortex chambers;

a plurality of input apertures formed in the first and second pre-combustion vortex chambers to allow the input of fluid tangentially into the pre-combustion vortex chambers for vaporizing the fluid.

6. A fuel processing chamber according to claim 5 wherein the plurality of input apertures are arranged in a plurality of rows and a plurality of columns.

7. A fuel processing chamber according to claim 5 further comprising a jacket formed around each of the pre-combustion vortex chambers to provide a differential supply of fluid to both of the pre-combustion vortex chambers.

8. A method of processing fuel for a turbine engine, comprising:

providing a preliminary mixing chamber;

introducing fuel into the mixing chamber;

introducing air into the mixing chamber;

mixing the fuel and the air in the preliminary mixing chamber to form a fuel-air mixture;

providing a secondary mixing chamber;

introducing the fuel-air mixture tangentially into the secondary mixing chamber to create a vortical flow and to break down into smaller particles any non-vaporized particles in the fuel-air mixture;

introducing additional air to the fuel-air mixture tangentially into the secondary mixing chamber.

9. A fuel processing chamber for turbine engines, comprising:

a fluid flow path having a high pressure end and a low pressure end;

a vortex housing defining first and second pre-combustion vortex chambers through which a fluid flow is directed, the pre-combustion vortex chambers being positioned along the fluid flow path and interposed in series between the high pressure end and the low pressure end to permit a fluid to flow from the high pressure end to the low pressure end, the pre-combustion vortex chambers each comprising back to back diverging-converging cones.

10. A fuel processing chamber for turbine engines according to claim 9, further comprising a plurality of input apertures formed in the first and second pre-combustion vortex chambers to allow the input of fluid tangentially into the pre-combustion vortex chambers for vaporizing the fluid, and first and second separate air fluid paths supplying air to the input apertures formed in the first and second pre-combustion vortex chambers, respectively.

11. A fuel processing chamber for turbine engines according to claim 9, further comprising:

a plurality of inlet apertures disposed normal to the first pre-combustion vortex chamber;

a plurality of inlet apertures disposed tangential to the first pre-combustion vortex chamber;

a plurality of inlet apertures disposed normal to the second pre-combustion vortex chamber;

a plurality of inlet apertures disposed tangential to the second pre-combustion vortex chamber.

12. A fuel processing system for a turbine engine, comprising:

a chamber housing defining a first pre-combustion vortex chamber and a second pre-combustion vortex chamber in series with the first pre-combustion vortex chamber;

a first air introduction passageway in fluid communication with the first pre-combustion vortex chamber, and a second air introduction passageway in fluid communication with the second pre-combustion vortex chamber;

a chamber output coupled to the second pre-combustion vortex chamber for discharging fluid from the second pre-combustion vortex chamber;

a combustion chamber connected to the chamber output, the combustion chamber comprising an ignitor;

one of the first or the second pre-combustion vortex chambers comprising an array of input apertures formed in the chamber housing to allow the input of fluid tangentially into the first or the second pre-combustion vortex chamber to create a vortical flow, the vortical flow breaking down into smaller particles and vaporizing any non-vaporized particles in the vortical flow.

13. A fuel processing system for a turbine engine according to claim 12, wherein the combustion chamber comprises a cylindrical portion and a conical flame holder.

\* \* \* \* \*